(12) United States Patent
Jones et al.

(10) Patent No.: US 8,609,977 B2
(45) Date of Patent: Dec. 17, 2013

(54) SELF BALLASTED CELESTIAL TRACKING APPARATUS

(75) Inventors: Jason Charles Jones, Berkeley, CA (US); Steven Michael Kraft, Albany, CA (US)

(73) Assignee: SunPower Corporation, San Jose, CA (US)

( * ) Notice: Subject to any disclaimer, the term of this patent is extended or adjusted under 35 U.S.C. 154(b) by 868 days.

(21) Appl. No.: 12/022,055

(22) Filed: Jan. 29, 2008

(65) Prior Publication Data

US 2009/0188487 A1   Jul. 30, 2009

(51) Int. Cl.
| | | |
|---|---|---|
| H01L 31/042 | (2006.01) | |
| H02N 6/00 | (2006.01) | |
| F24J 2/38 | (2006.01) | |
| G01C 21/02 | (2006.01) | |
| G01C 21/24 | (2006.01) | |
| G01J 1/20 | (2006.01) | |

(52) U.S. Cl.
USPC ........... 136/246; 136/244; 136/251; 126/600; 250/203.1; 250/203.4

(58) Field of Classification Search
USPC .......................... 136/243–244, 246, 259, 251; 250/203.1, 203.4; 126/600
See application file for complete search history.

(56) References Cited

U.S. PATENT DOCUMENTS

| | | | |
|---|---|---|---|
| 3,059,889 A | | 6/1960 | Pottmeyer |
| 4,203,426 A | * | 5/1980 | Matlock et al. ............... 126/605 |
| 4,234,352 A | | 11/1980 | Swanson |
| 4,245,895 A | * | 1/1981 | Wildenrotter ................. 359/848 |
| 4,299,445 A | * | 11/1981 | Aucouturier .................. 359/846 |
| 4,583,520 A | | 4/1986 | Dietrich |
| 4,834,805 A | | 5/1989 | Erbert |
| 4,870,949 A | | 10/1989 | Butler |
| 6,058,930 A | | 5/2000 | Shingleton |
| 6,559,371 B2 | | 5/2003 | Shingleton |
| 7,115,851 B2 | | 10/2006 | Zhang |
| 2003/0172922 A1 | * | 9/2003 | Haber ........................... 126/600 |
| 2008/0128015 A1 | | 6/2008 | Shugar |

OTHER PUBLICATIONS

Garret Hering, "A Market Offering Many Choices", Photon International, Apr. 2007, p. 123-137, Solar Verlag Gmbh, Aachen, Germany.
Jochen Siemer, "X Marks the Spot", Photon International, Oct. 2007, p. 114-140, Solar Verlag Gmbh, Aachen, Germany.
Sunpower Corporation, "T20 Tracker: Higher Energy Delivery & Rapid Deployment", http://sunpowercorp.com/Products-and-Services/Trackers.aspx, undated, p. 1-2, SunPower Corporation, San Jose, USA.

(Continued)

*Primary Examiner* — Jonathan Johnson
*Assistant Examiner* — Lindsey Bernier
(74) *Attorney, Agent, or Firm* — Knobbe Martens Olson & Bear LLp (57) ABSTRACT

The invention is a wind resistant celestial tracking apparatus that uses gravitational forces acting on the moving elements of the structure to provide overturning resistance. A molded self curing compound, such as reinforced concrete, is used as the structural material that provides the mass, and thus the gravitational overturning resistance that reduces or eliminates the need for a massive ballasted or dug-in foundation. The combination of these features potentially lowers cost significantly over that of tracking apparatuses found in prior art. The invention is appropriate for use in any celestial tracking application with any number of axes of motion, but is particularly useful in two axis solar energy collection systems.

10 Claims, 11 Drawing Sheets

Rear View

(56) References Cited

OTHER PUBLICATIONS

Poulek Solar Co. Ltd, "Traxle Installation and Maintenance Instructions", http://solar-trackers.com/installation-guides.asp, undated, p. 1-7, Poulek Solar Co. Ltd, Prague East District, Czech Republic.

Bernt Lorentz Gmbh & Co. KG, "Tracking Systems for Solar Parks", http://www.lorentz.de/ongrid/en/products/solarparks/intro, undated, p. 1-2, Bernt Lorentz Gmbh & Co KG, Henstedt-Ulzburg, Germany.

Ades Energia Superior, Solar Tracker Catalogue, http://www.ades.tv/index.php?cual=solarb, undated, p. 1-12, Zaragoza, Spain.

Solon America Corporation, "SOLON Mover: the intelligent power plant solution", http://solonmover.com/english/mover.htm, May 2007, p. 1-2, Solon America Corporation, Tucson, USA.

Array Technologies, Inc., "Installation Instructions for the Wattsun AZ-225 Tracking System", http://www.wattsun.com/reference.html, undated, p. 5, Array Technologies, Inc., Albuquerque, USA.

* cited by examiner

Fig. 1—Rear View

Fig. 2—Exploded View Of Azimuth Axis

Fig. 3—Target Axis Orientation

Fig. 4—Exploded View of Contact Region

Fig. 5—Wind Loading And Reactions

Fig. 6—Tilt Roll Rear View

Fig. 7—Close-up View Of Tilt Axis

Fig. 8—Close-up View Of Contact Region

Fig. 9—Wind Loading And Reactions

Fig. 10—Single Axis Embodiment

Fig. 11—Alternative Payload Assemblies

SELF BALLASTED CELESTIAL TRACKING APPARATUS

CROSS-REFERENCE TO RELATED APPLICATIONS

Not applicable

STATEMENT REGARDING FEDERALLY SPONSORED RESEARCH OR DEVELOPMENT

Not applicable

BACKGROUND

1. Field of Invention

The present invention relates to celestial tracking apparatuses, specifically a wind resistant structure for celestial tracking apparatuses.

2. Prior Art

There is substantial prior art relating to the design and configuration of celestial tracking apparatuses. For example, U.S. Pat. Nos. 3,059,889 (Pottmeyer), 4,870,949 (Butler), and 6,058,930 (Shingleton) all show different configurations of one and two axis celestial tracking apparatuses.

These apparatuses are generally designed to orient a payload, such as a directional radio frequency antenna, a light reflective surface, or a solar energy collection device, toward celestial objects. In the case of a radio antenna, the celestial object could be the sun, a star or planet, or a man-made orbiting satellite. In the case of a light reflective surface, such systems are typically oriented to reflect solar radiation toward an energy collection device. In the case of solar energy collection devices, the system typically orients the payload such that the collection surface minimizes the angle between the axis normal to the device and the solar radiation.

For solar energy collection systems in general, the payload can be one of a number of different energy collection or reflection devices. These can include, among other things, photovoltaic (PV) modules, concentrating PV modules, or concentrating solar thermal devices.

PV modules, or flat plate PV modules as they are also known, generally include one or more planar devices that convert solar radiation into electricity by way of the photoelectric effect. PV modules are the dominant technology in solar energy collection systems.

Concentrating PV modules also use the photoelectric effect to produce electricity, but the modules use refraction, reflection, or some other optical technique to concentrate the incident solar radiation onto a PV device. Concentrating PV modules are generally of a thicker form factor than flat plate PV modules. Some examples of prior art relating to concentrating PV modules are found in U.S. Pat. Nos. 4,834,805 (Erbert) and 6,559,371 (Shingleton).

Besides modules, other concentrating PV form factors are also found in the prior art. A typical example is a paraboloidal or spherical reflector that focuses solar radiation at a PV device positioned at or near the focal point. An example of prior art for this configuration is found in U.S. Pat. No. 4,234,352 (Swanson). In some cases, the solar radiation is captured by a thermal device, such as a stirling engine or steam generator, which is coupled to an electric generator. The thermal device can be part of the payload, as is shown in U.S. Pat. No. 4,583,520 (Dietrich).

In yet another concentrating configuration the tracking apparatus is a heliostatic device, upon which a reflective payload is mounted. The energy collection device is mounted remotely, and is typically a solar thermal device as described above. An example of a tracking apparatus used in this type of configuration is shown in U.S. Pat. No. 7,115,851 (Zhang).

In general, celestial tracking apparatuses include one or more axes of motion, the function of which is to allow the collector to be oriented as described above. In the theoretically ideal case, two axes of motion are sufficient to orient the collector to face in any desired direction. Practically speaking, mechanical considerations can limit the range of motion such that the tracking apparatus might not be able to address all arbitrary points in the sky. However, in many applications, such as solar energy collection systems, the range of desired orientations is also limited to a subset of the visible sky. For instance, in the northern hemisphere below the arctic circle, a due North orientation is unlikely to be desirable, since the sun is never located in that direction.

As mentioned previously, a two axis tracking apparatus is theoretically sufficient for perfect tracking of a celestial object. However, other practical considerations have resulted in different configurations in the prior art. In solar energy collection systems, such as those using flat plate PV modules, precise orientation relative to the sun is not always critical. This is because small deviations from a module orientation normal to the direction of incident solar radiation results in only small reductions in energy collection. As such, single axis tracking apparatuses, which are generally not capable of orienting the energy collection device perfectly normal to the solar radiation, are commonly used in solar PV systems.

Further, dual axis designs may not have the dynamic range required to address a large portion of the sky while maintaining the high accuracy required for high concentration PV modules or for telescope applications. As such, additional axes may be required in some cases to trim the orientation of the collector to more precisely track the celestial object.

Celestial tracking apparatuses can be installed in any number of locations, but in general the installation can be classified as either ground mounted or structure mounted. A ground mounted tracking apparatus is one that is installed in direct contact with the ground. Ground mounted systems often include a foundation as the interface between the apparatus and the ground. Ground mounted systems also include tracking apparatuses that are installed on existing concrete slabs or other similar situations. Structure mounted tracking apparatuses are those that are installed on an existing structure, or those that are attached to a structure that fulfills a separate purpose. For example, a tracking apparatus can be installed on the roof of an existing building, or can be constructed as part of a parking structure or carport.

Regardless of the type, all celestial tracking apparatuses must be designed to resist a set of design loads. Depending on the specific circumstances of the installation, these loads can include the dead load, or load due to gravity, wind loads, snow loads, and seismic loads. In many cases, the wind load is the dominant factor in tracker design.

While not always the case, the wind is a substantially horizontal phenomenon, and as such tends to impart lateral loads. Among other effects, lateral loads acting above the base of the apparatus tend to impart an overturning moment. Apparatus designs found in prior art resist overturning moments through the use of a foundation. In the prior art, the foundation is generally responsible for providing overturning moment resistance and can generally be divided into two categories. One type can be categorized as a dug-in foundation, which means that the base of the structure extends substantially into the ground. A typical example of such a system can be viewed in the Installation Instructions for the Wattsun AZ-225 Tracking System from Array Technologies. With a dug-in foundation, wind loads that act to overturn the structure are resisted by lateral forces between the soil and the foundation. While this is a well established and understood foundation type that effectively resists wind loads, it also has some disadvantages. Primary among these is the additional cost of excavation required to insert the foundation into the ground. Another consideration with dug-in foundations is that variability in soil conditions can make it difficult to predict how much resistance to overturning the foundation can provide without measuring soil conditions at the precise location where the foundation will be placed.

A second category of established wind resistant foundation design is ballasted foundations. Ballasted foundations generally use a mass of fixed material, such as concrete, as a base for the tracking apparatus. Ballasted foundations typically rest directly on the ground or extend only slightly below the surface, and rely primarily on gravitational forces acting on the foundation to prevent the structure from overturning. The Solon Mover sold by Solon AG of Germany is one of several example of prior art that use a ballasted foundation. While this type of foundation reduces the cost and variability concerns associated with the dug-in foundations mentioned above by reducing the excavation costs, the amount of material required to provide sufficient mass for the foundation can result in an inefficient use of materials.

Note that although the prior art examples described above primarily show two axis tracking apparatuses, both dug-in foundations and ballasted foundations are prevalent in single axis tracking apparatus prior art as well. As an example if a dug-in foundation, in U.S. Pat. No. 6,058,930, Shingleton describes a single axis tracking apparatus that is mounted on footings of poured concrete supported in the Earth. SunPower Corporation's T20 Tracker, which is a tilted axis single axis tracker (http://sunpowercorp.com/Products-and-Services/Trackers.aspx), uses three ballasted foundations as the bases for a tripod-like structure.

While wind resistant tracking apparatus foundation designs are both well known and effective, these designs are by no means optimal. In particular, traditional foundation designs are costly, with the cost of materials and installation for tracking apparatus foundations typically representing approximately 25% or more of total mounting system cost. In cost sensitive applications such as solar energy systems cost reduction is always desirable, but the prospects of cost reduction for prior art designs are limited. This is particularly the case for ballasted foundation designs, because the minimum mass of foundation material required to prevent overturning is fixed by the apparatus design and thus can not be further reduced.

For dug-in foundations, the problems associated with the unpredictability of soil property variations also appears difficult to solve. Further, the long term trend in costs associated with the intensive labor needed for the excavation required for such foundations appears to be upward. As such, it does not appear that significant reductions in foundation costs are likely within the scope of traditional designs.

Despite the many variations of tracking apparatus configurations described above, the materials used to build the structures of these systems are generally the same. In nearly all cases where the system is ground mounted, the tracking apparatus contacts the Earth through a foundation. In many cases, the foundation is made of reinforced concrete placed at or below grade in such a manner as to resist loads on the system and to distribute those loads over a sufficiently large area of soil.

The structure above the foundation, on which the PV modules are mounted and which comprises the tracking mechanism are generally made of metal. As tracking apparatuses are usually exposed to the elements over long design lifetimes of 25 years or more, it is desirable to use materials that are corrosion resistant. The most common materials used in these applications are painted, epoxy coated, or galvanized steel and/or aluminum. While these materials can be sufficient for the application, there are several disadvantages to their use that are difficult to solve. Among these are:

(a) Metals that are inherently corrosion resistant, such as aluminum or stainless steel are generally more expensive than less corrosion resistant such as untreated carbon steel. As such, use of such materials can negatively impact the economics of a particular installation.

(b) While carbon steel is less expensive than aluminum or stainless steel, it subject to corrosion under normal atmospheric conditions. A common technique for improving the corrosion resistance of carbon steel is galvanization, which forms a layer of zinc alloy at the surface that acts as a sacrificial anode. Typically, galvanization can extend the life of steel in atmospheric conditions to 30 years or more. However, the galvanizing process increases the cost of the raw material significantly. Furthermore, the galvanizing process is generally considered to be environmentally hazardous, and as such the number of domestic suppliers has been in recent decline.

(c) Because even the most commonly available metals are generally expensive materials, it is desirable to design systems in such a way as to minimize their use. The minimization of material use tends to lead to tracking apparatus structure designs that are often complex. The manufacturing processes required to build components for complex systems are generally not suitable for performance in the field. As a result, components are usually manufactured and often assembled at locations remote to the final installation site. This can result in increased shipping costs.

Reinforced concrete is a common material used in a wide range of structures, from buildings to bridges to utility poles. As such, the formulation, production, forming, placing, and handling of reinforced concrete is extremely common and well known in construction practice. Although not found in the prior art, the use of reinforced concrete in tracking apparatus structures in addition to its use in prior art as a foundation material is potentially advantageous. This is due in part to the much lower cost of reinforced concrete on an equivalent strength basis when compared to the aforementioned metals currently used for such structures. Reinforced concrete is also inherently corrosion resistant in normal atmospheric conditions. Furthermore, reinforced concrete can be molded into a wide range of shapes, which allows some optimization of structural elements for a specific application.

SUMMARY

The invention is a celestial tracking apparatus that resists overturning forces due to wind in part through gravitational forces acting on the moving elements of the structure. This reduces or eliminates the need for a massive ballasted or dug-in foundation and potentially reduced the total cost of installation.

DETAILED DESCRIPTION

FIGS. 1, 2, 3, 4, 5

First Embodiment

In a first embodiment, the invention is embodied as an azimuth-elevation style tracking apparatus comprising a support 20, a tracking assembly 22, and a payload assembly 24. Support 20 is mounted on a surface 26 at a contact surface 27. In this embodiment, surface 26 is realized as the Earth. In other embodiments, surface 26 could be a separate structure, such as a the roof of a dwelling.

In the first embodiment, support 20 comprises a support track 28 and a center bearing support 30 mounted on a concrete slab 32. Concrete slab 32 is mounted on surface 26 and has a center of mass 33.

In other embodiments, concrete slab 32 may not be necessary, as support track 28 could be mounted directly to surface 26.

In the first embodiment, tracking assembly 22 comprises an azimuth structure 34, an elevation structure 36, and an elevation bearing set 38 by which elevation structure 36 is coupled to azimuth structure 34. Tracking assembly 22 has a center of mass 40. Azimuth structure 34 comprises an azimuth ring 42 and two of a vertically oriented azimuth truss 44, all of which are constructed substantially of reinforced concrete. Azimuth structure 34 has a center of mass 45. Two of an elevation bearing housing 46 are attached to the top of each azimuth truss 44 and define the outer race of elevation bearing set 38. An elevation axis 48 passes through the center of rotation of elevation bearing set 38 and is substantially horizontal. An elevation actuator 50 is coupled between azimuth structure 34 and elevation structure 36. In this embodiment, elevation actuator 50 is realized as an electrically operated linear actuator.

In the first embodiment, azimuth structure 34 is coupled to support 20 by an azimuth bearing assembly 52. An azimuth axis 54 about which azimuth bearing assembly 52 rotates is substantially vertical. Azimuth bearing assembly 52 comprises a set of three or more azimuth wheels 56 and a center bearing assembly 58. The set of azimuth wheels 56 interface with support track 28 and center bearing support 30 is inserted into a center bearing housing 62 affixed to azimuth ring 42. An azimuth actuator 64 is coupled between azimuth structure 34 and support 20. In this embodiment, azimuth actuator 64 is realized as an electrical motor with a drive wheel (not shown) frictionally coupled to support track 28.

Elevation structure 36 comprises an elevation axle 66, six each of a support brace 68, and a center of mass 69. Elevation axle 66 acts as the inner race of elevation bearing set 38, and is inserted into each elevation bearing housing 46. Support braces 68 are affixed to elevation axle 66 such that support braces 68 form a plane on which payload assembly 24 is mounted. One end of elevation actuator 50 is pivotally attached to one support brace 68.

Payload assembly 24 is mounted on elevation structure 36. Payload assembly 24 comprises a facing plane 70, a target axis 72, a center of mass 74, and one or more payload devices 76. In the first embodiment, payload devices 76 are shown as an array of flat plate PV modules 78. In other embodiments, payload devices 76 could be any device or structure that captures, reflects, refracts, or interacts with electromagnetic energy, or any combination thereof. The surface of PV modules 78 is substantially coincident with facing plane 70. Target axis 72 is normal to facing plane 70.

Figure 3:
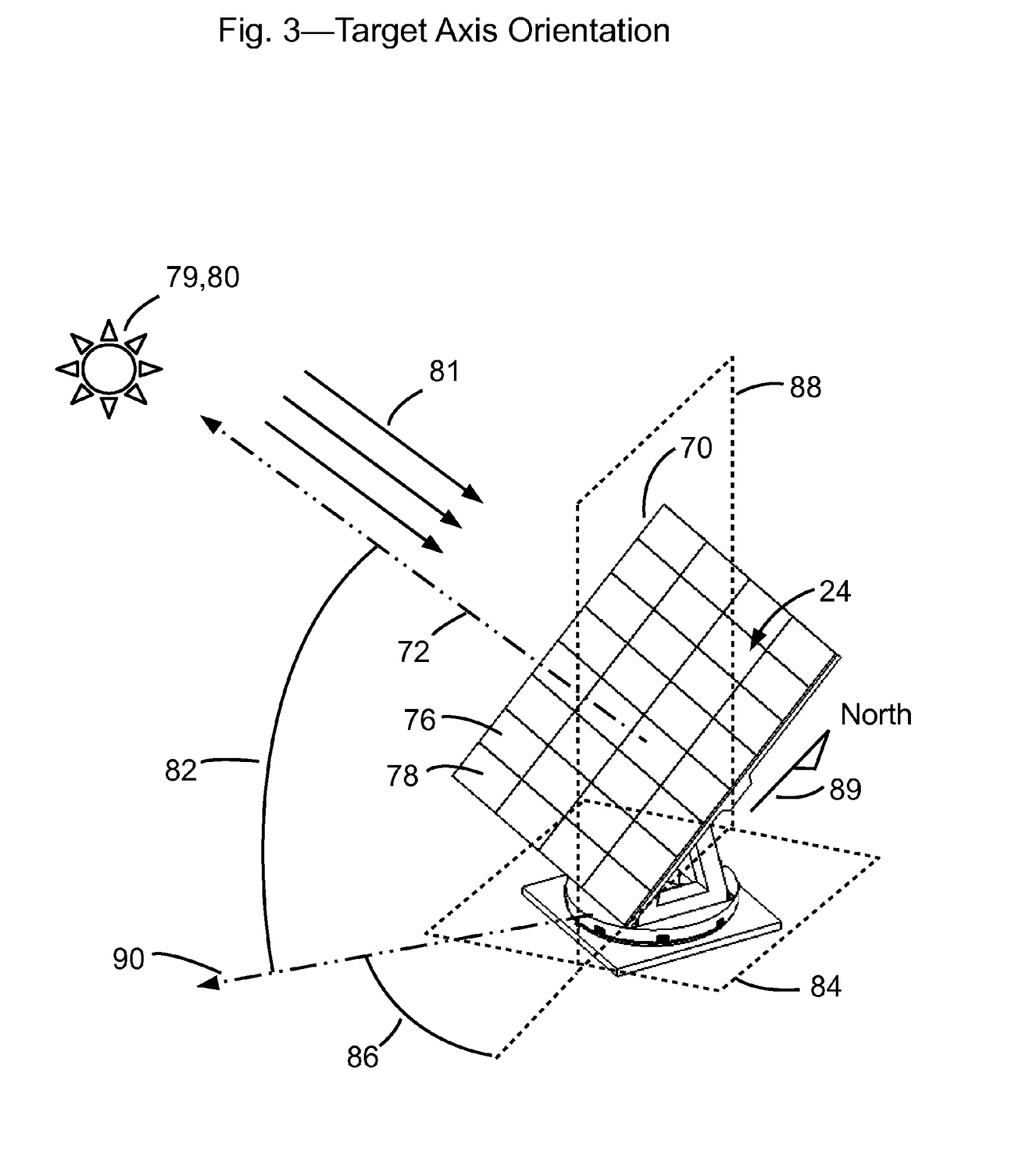
FIG. 3 is a front perspective view of an azimuth-elevation style two axis tracking apparatus showing the target axis orientation and reference dimensions.

An elevation angle 82, is defined as the vertical angle between a fixed horizontal plane 84 and target axis 72. An azimuth angle 86, is defined as the angle between a fixed vertical plane 88 and the projection 90 of target axis 72 onto horizontal plane 84. As a matter of convention, vertical plane 88 is oriented to align with the North/South direction 89, with the zero angle defined as the orientation in which horizontal projection 90 is South facing.

Figure 4:
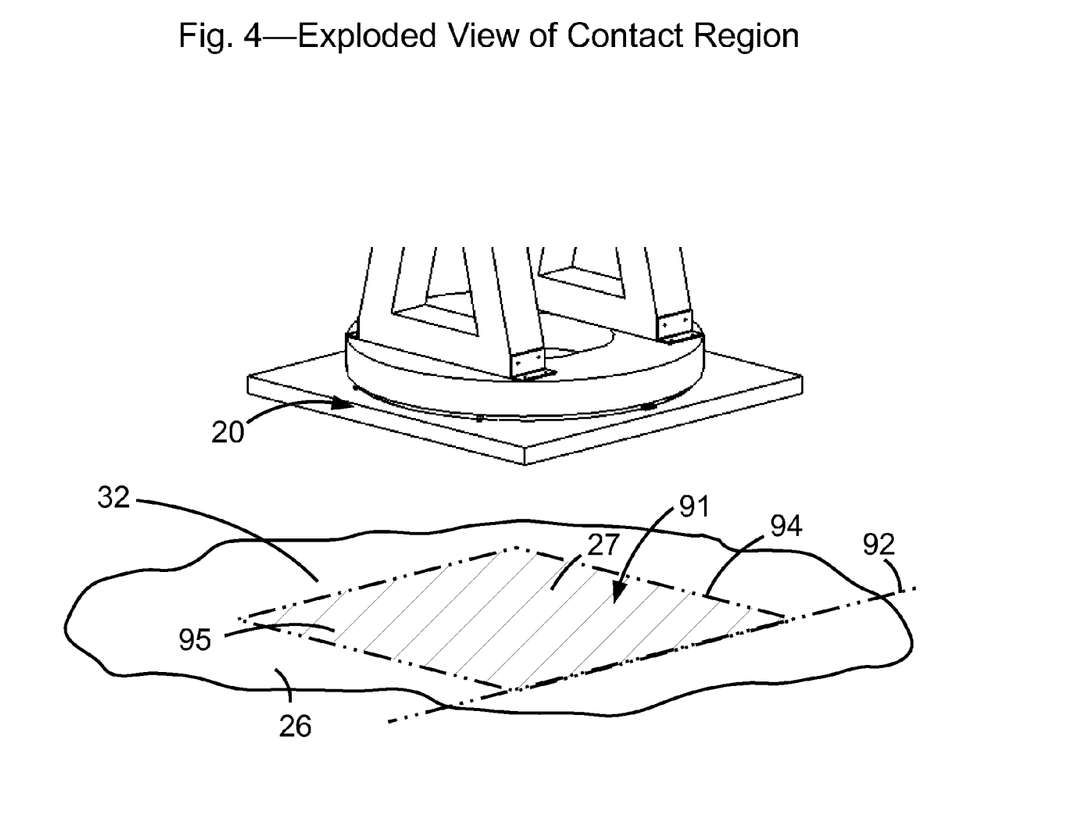
FIG. 4 is a close-up perspective view of the contact region and an overturning axis of an azimuth-elevation style two axis tracking apparatus.

A contact region 91 is defined as the minimum possible area that includes all contact surfaces 27 and is convex in shape. Within the scope of this document, the term "convex shape" is defined as a closed area for which a line segment drawn between any two points within the area remains completely within the area. In other words, any line drawn between two points within the area does not pass outside the area. In the first embodiment, contact region 91 is identical to contact surface 27, but in other embodiments these areas may not be identical.

An overturning axis 92 is defined as passing through one or more points along a boundary 94 of contact region 91. Overturning axis 92 is further defined such that it does not pass through the inner area 95 of contact region 91. In other words, overturning axis 92 is coincident with the edge of contact region 91. Overturning axis 92 is yet further defined to be located such that a net overturning moment (defined below) is maximized about it at any given time. Overturning axis 92 is thus the axis about which the tracking apparatus is most likely to overturn due to wind loading.

Figure 5:
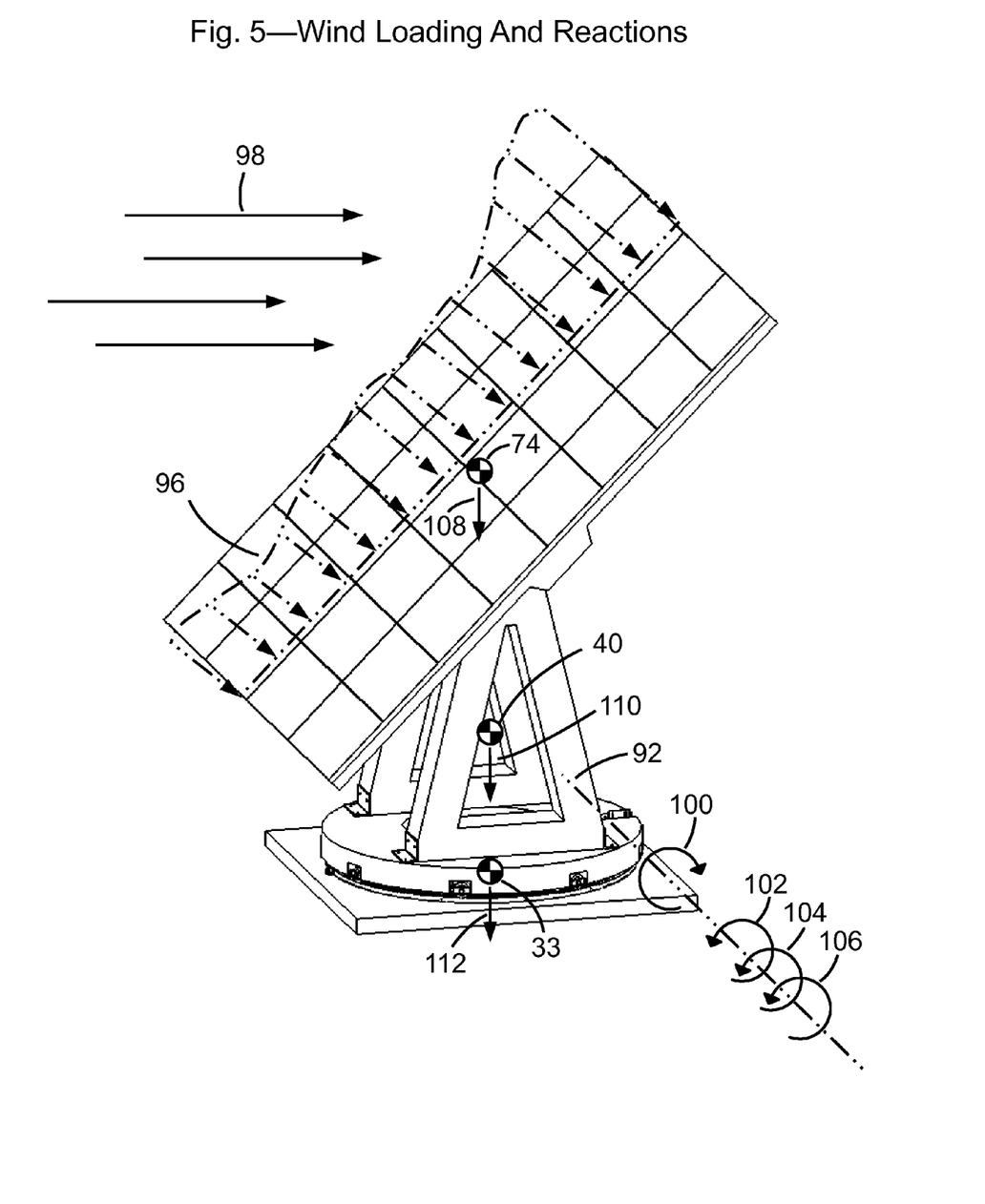
FIG. 5 is a perspective view of an azimuth-elevation style two axis tracking apparatus showing wind loading and reaction forces.

A wind pressure 96 is a pressure profile acting on the tracking apparatus due to a wind 98. A wind moment 100 is the total moment about overturning axis 92 due to wind pressure 96. A payload assembly moment 102, a tracking assembly moment 104, and a support moment 106 are moments about overturning axis 92 due to gravitational forces 108, 110, and 112 acting on payload assembly 24 at center of mass 74, acting on tracking assembly 22 at center of mass 40, and acting on support 20 at center of mass 33, respectively. A net gravitational moment (not shown) is the net combination of payload assembly moment 102, tracking assembly moment 104, and support moment 106. A net overturning moment (not shown) is the combination of the net gravitational moment and wind moment 100 acting on the tracking apparatus.

Operation

Figure 1:
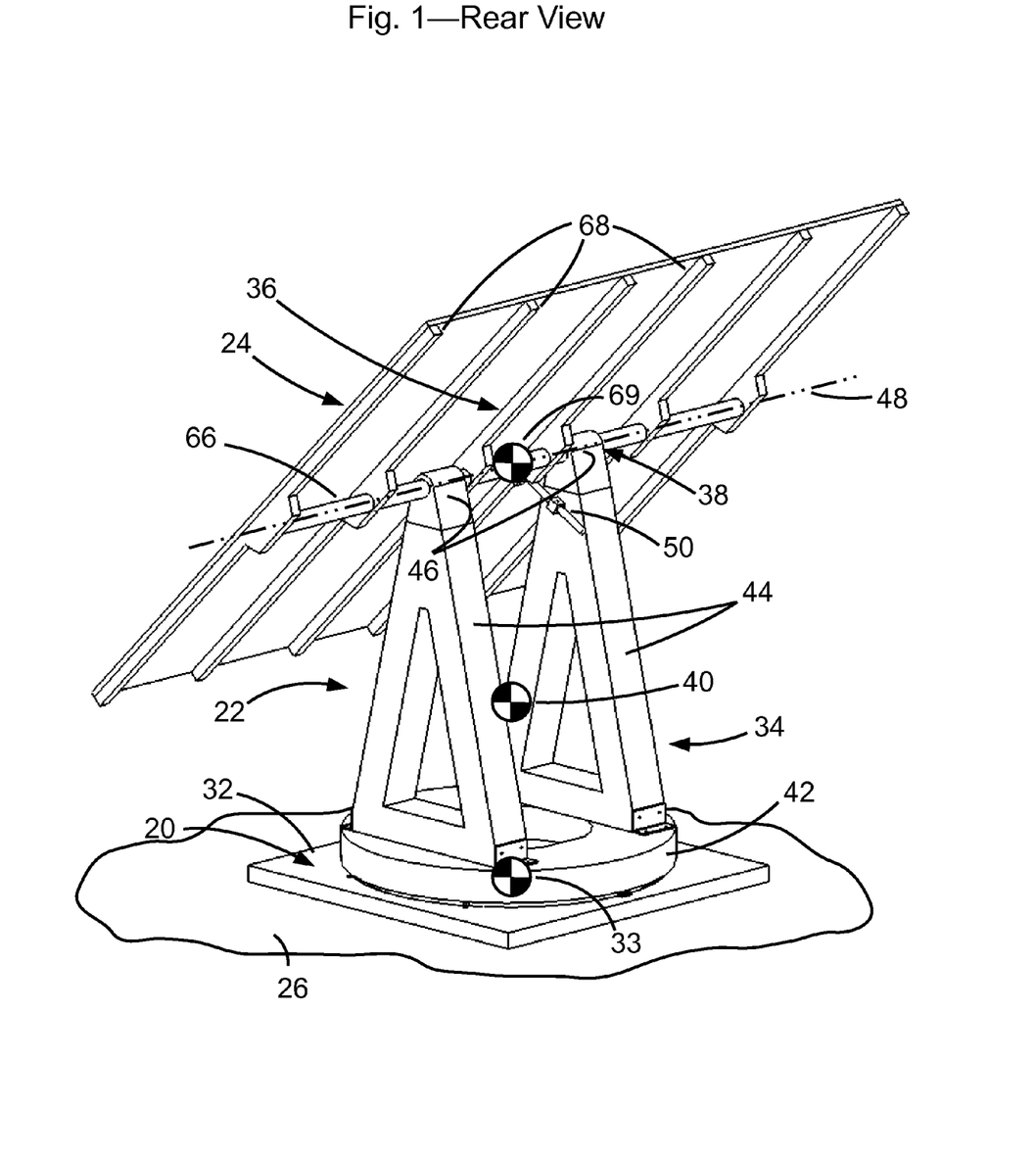
FIG. 1 is a rear perspective view of an azimuth-elevation style two axis tracking apparatus.

The primary function of the celestial tracking apparatus is to orient target axis 72 toward a target location 79 and thus orient facing plane 70 at a controlled angle relative to an electromagnetic radiation 81. In the first embodiment, payload devices 76 are realized as an array of flat plate PV modules 78, for which the optimum target location 79 is generally the current location of the Sun 80. To achieve this orientation, the positions of the azimuth actuator 64 and elevation actuator 50 are set such that the combination of azimuth angle 86 and elevation angle 82 results in target axis 72 substantially directed at Sun 80.

Figure 2:
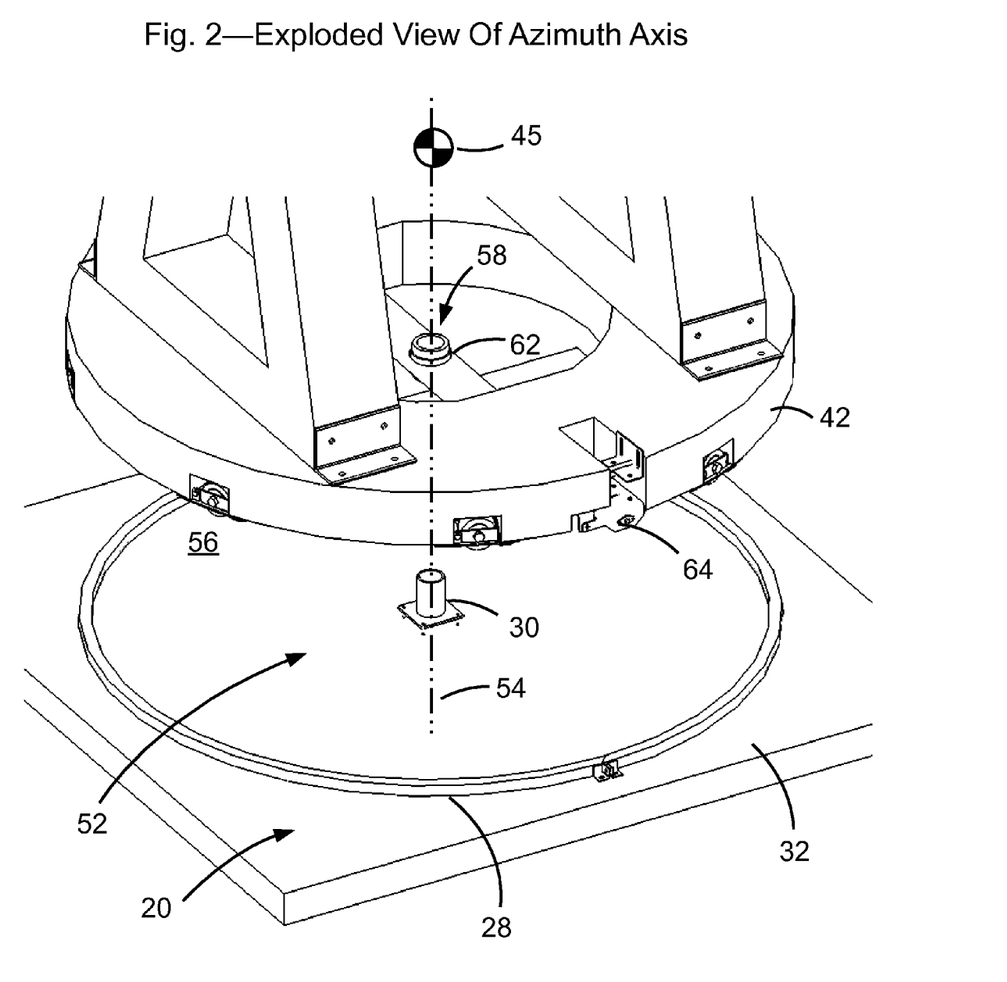
FIG. 2 is an exploded view of the azimuth bearing assembly for an azimuth-elevation style two axis tracking apparatus.

In the first embodiment, one function of support 20 is to provide a stable base for the celestial tracking apparatus. Support 20 accomplishes this function by distributing gravitational, wind, and other loads from the tracking apparatus to surface 26. In this embodiment, support track 28 transfers vertical loads from azimuth wheels 56 to surface 26 via concrete slab 32. Likewise, center bearing support 30 transfers loads from center bearing housing 62 to surface 26 via concrete slab 32. Center bearing support 30 also acts as a pivot point to keep tracking assembly 22 centered on support track 28.

In the first embodiment, one function of azimuth structure 34 is to support elevation bearing set 38, and to orient elevation axis 48 substantially perpendicular to the direction of electromagnetic radiation 81. Azimuth structure 34 is rotated about azimuth axis 54 by azimuth actuator 64, which in this embodiment is realized as an electric motor and drive wheel (not shown) that frictionally applies motive forces between azimuth structure 34 and support track 28. An additional function of azimuth structure 34 is to contribute to tracking assembly moment 104 by way of the location of its center of mass 45 relative to overturning axis 92. The use of a low-cost, low-strength structural material, such as reinforced concrete, as the structural material for azimuth ring 42 and each azimuth truss 44 further contributes to the tracking assembly moment 104 by increasing the mass of these elements. In this embodiment, azimuth structure 34 is substantially rotationally symmetric about azimuth axis 54. As such, center of mass 45 is located at or near azimuth axis 54 and thus provides a moment arm over which its contribution to tracking assembly moment 104 can be developed regardless of the direction of wind 98.

In the first embodiment, one function of elevation structure 36 is to provide structural rigidity and strength to payload assembly 24. By way of rotation about elevation axis 48, elevation structure 36 also allows elevation angle 82 to be set in conjunction with azimuth angle 86 such that target axis 72 can be oriented as desired. In this embodiment, elevation actuator 50 is realized as an electrically operated linear actuator, the extension of which causes elevation structure 36 to rotate relative to azimuth structure 34 about elevation axis 48. An additional function of elevation structure 36 is to contribute to tracking assembly moment 104 by way of the location of its center of mass 69 relative to overturning axis 92. Similarly to azimuth structure 34 as described above, elevation structure 36 is substantially rotationally symmetric about azimuth axis 54 and elevation axis 48. As such, center of mass 69 is located at or near azimuth axis 54 and thus provides a moment arm over which its contribution to tracking assembly moment 104 can be developed relative to overturning axis 92 regardless of wind direction.

In the first embodiment, one function of payload assembly 24 is to collect electromagnetic energy 81 and covert it to a usable form. By way of payload assembly's 24 attachment to elevation structure 36, the orientation of target axis 72 is controlled by the orientation of elevation structure 36. An additional function of payload assembly 24 is to contribute to payload assembly moment 102 by way of the location of its center of mass 74 relative to overturning axis 92.

Under normal operating conditions, the net overturning moment acts in a direction such that it is counteracted by contact pressure acting on contact surface 27. However, if wind pressure 96 becomes large enough, for example in high wind conditions, net overturning moment could change sign. This would result in a rotational acceleration of the tracking apparatus about overturning axis 92, which could ultimately topple the tracking apparatus. It follows that if the net gravitational moment is established to be greater than the maximum wind moment 100 expected to be experienced during the operating life of the tracking apparatus, then the tracking apparatus will not be expected to overturn due to wind forces.

For overturning purposes it should be clear that the total mass of the tracking apparatus is an important factor. However, this mass can be provided by fundamentally different structural components. As described previously, one class of prior art that uses ballasted foundations uses the mass of structures functionally similar to support 20 for this purpose. In the prior art, the structural equivalents of tracking assembly 22 and payload assembly 24 also provide some overturning resistance due to gravitational forces, but the magnitude of the contribution is extremely limited. The reason for this is that prior art designs generally minimize the mass of the moving components, as they are constructed of expensive materials.

In the first embodiment, the use of a lower cost material such as reinforced concrete for much of tracking assembly 22 allows the mass of the structure to be increased without a significant cost penalty due to the lower cost per unit strength nature of reinforced concrete compared to typical alternatives such as steel or aluminum. This, in turn, reduces the ballasting requirement of the foundation by virtue of the fact that moving structural elements (i.e. tracking assembly 22 and payload assembly 24) in combination provide the majority of the net gravitational moment.

Another advantage of the first embodiment is that due to the substantially axial symmetry of the apparatus, the distance between the wind resisting centers of mass 40 and 74 and any possible overturning axis 92 is generally constant. Therefore, the overturning resistance of the apparatus is the same independent of wind direction. Wind direction relative to target axis 72 may have an effect on the magnitude of wind moment 100, however, and the worst case direction should be considered when determining what magnitude of the net gravitational moment is required to prevent overturning.

Figure 7:
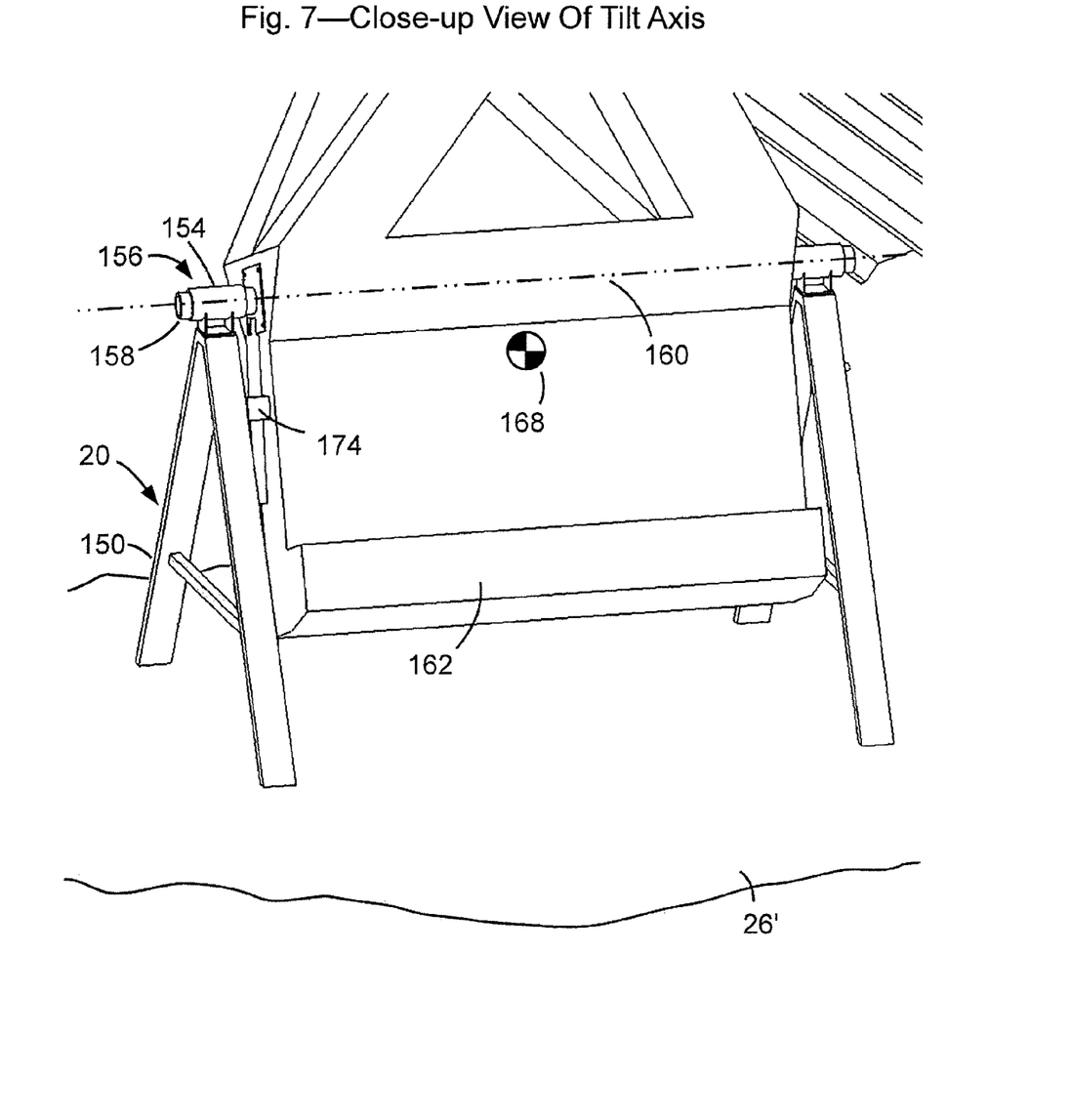
FIG. 7 is a close-up perspective view of the tilt axis and overturning axis for a tilt-roll style two axis tracking apparatus.
Figure 8:
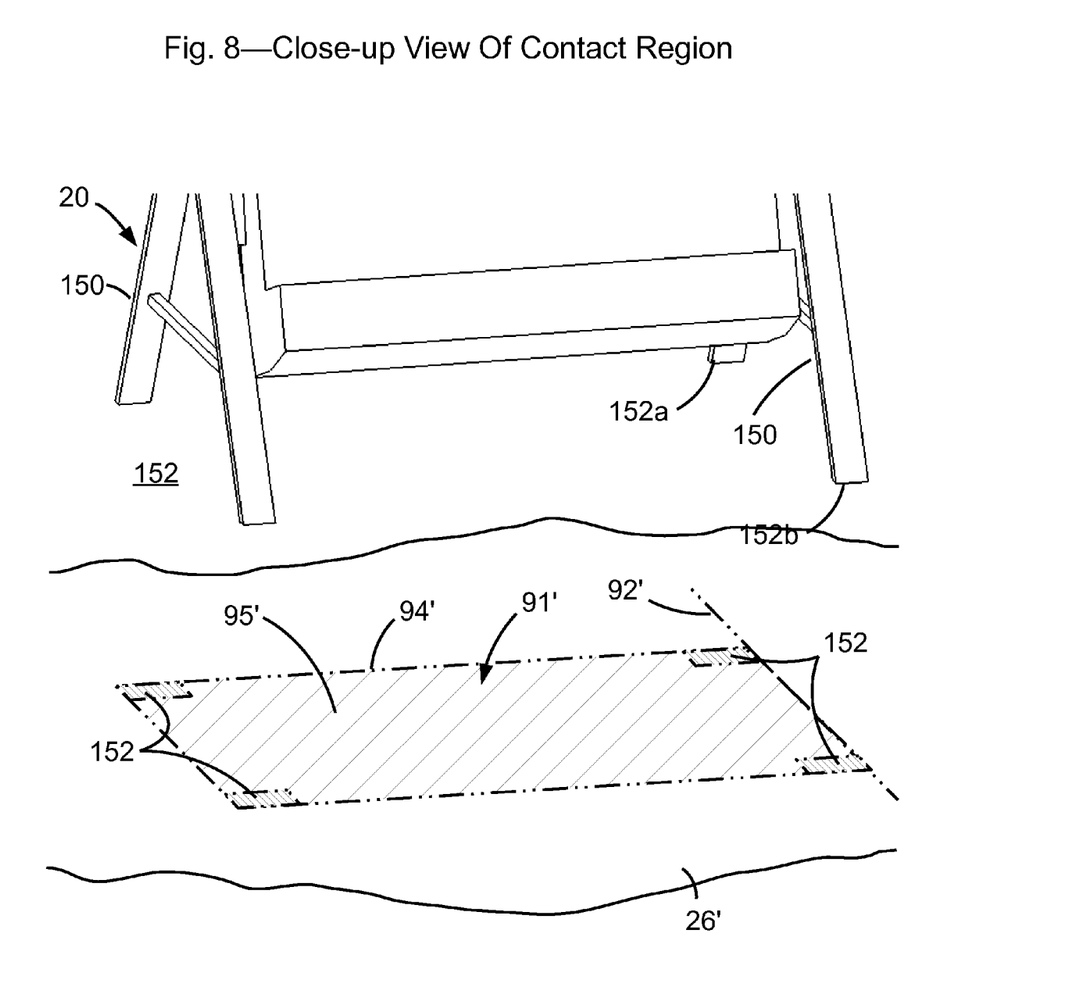
FIG. 8 is a close-up perspective view of the contact region and an overturning axis of a tilt-roll style two axis tracking apparatus.
Figure 9:
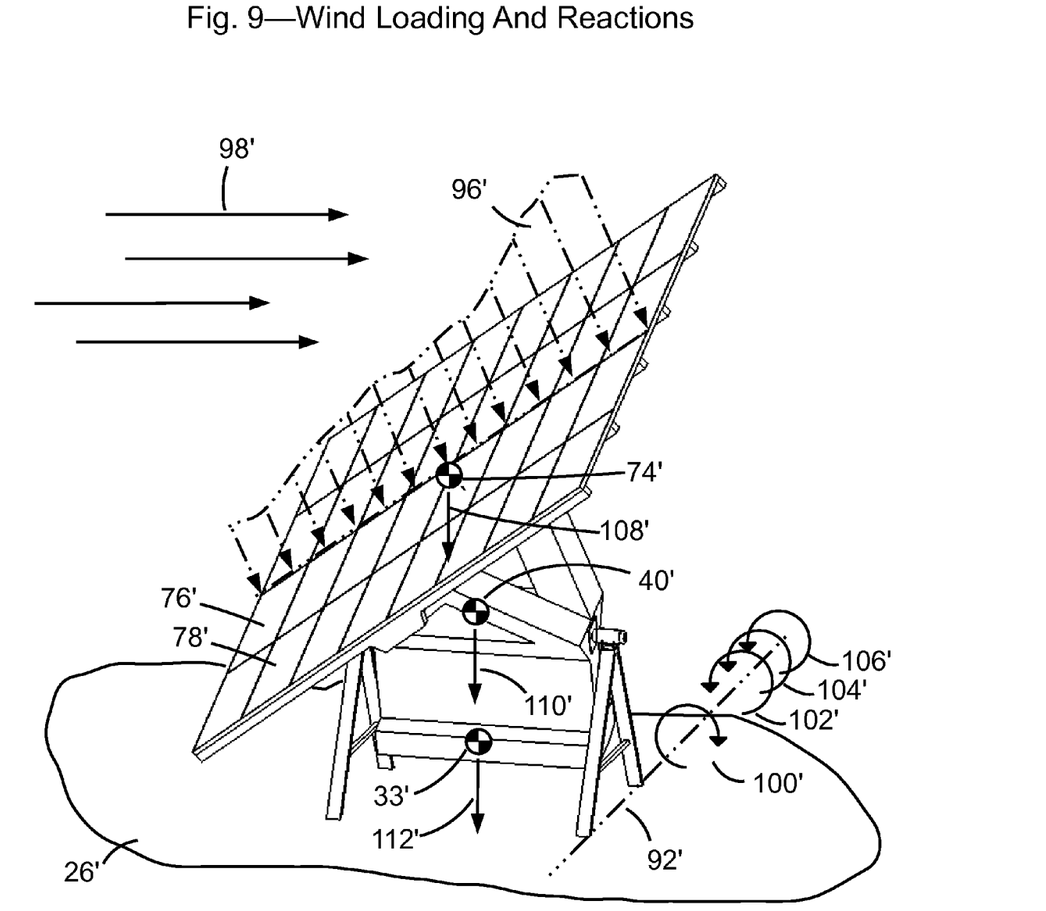
FIG. 9 is a perspective view of a tilt-roll style two axis tracking apparatus showing wind loading and reaction forces.

FIGS. 7, 8, 9

Second Embodiment

In a second embodiment, the invention is embodied as a tilt-roll style tracking apparatus comprising a support 20' and a tracking assembly 22' that are modified from those described in the first embodiment, and payload assembly 24' that is similar to that described in the first embodiment. Note that the prime notation (for example 20') indicates an element that is similar in form and function and name to an element in the first embodiment having the unprimed notation (in this case, 20). Support 20' is mounted on surface 26', which in this embodiment is realized as the Earth. In other embodiments, surface 26' could be a separate structure, such as the roof of a dwelling or a concrete surface.

Figure 6:
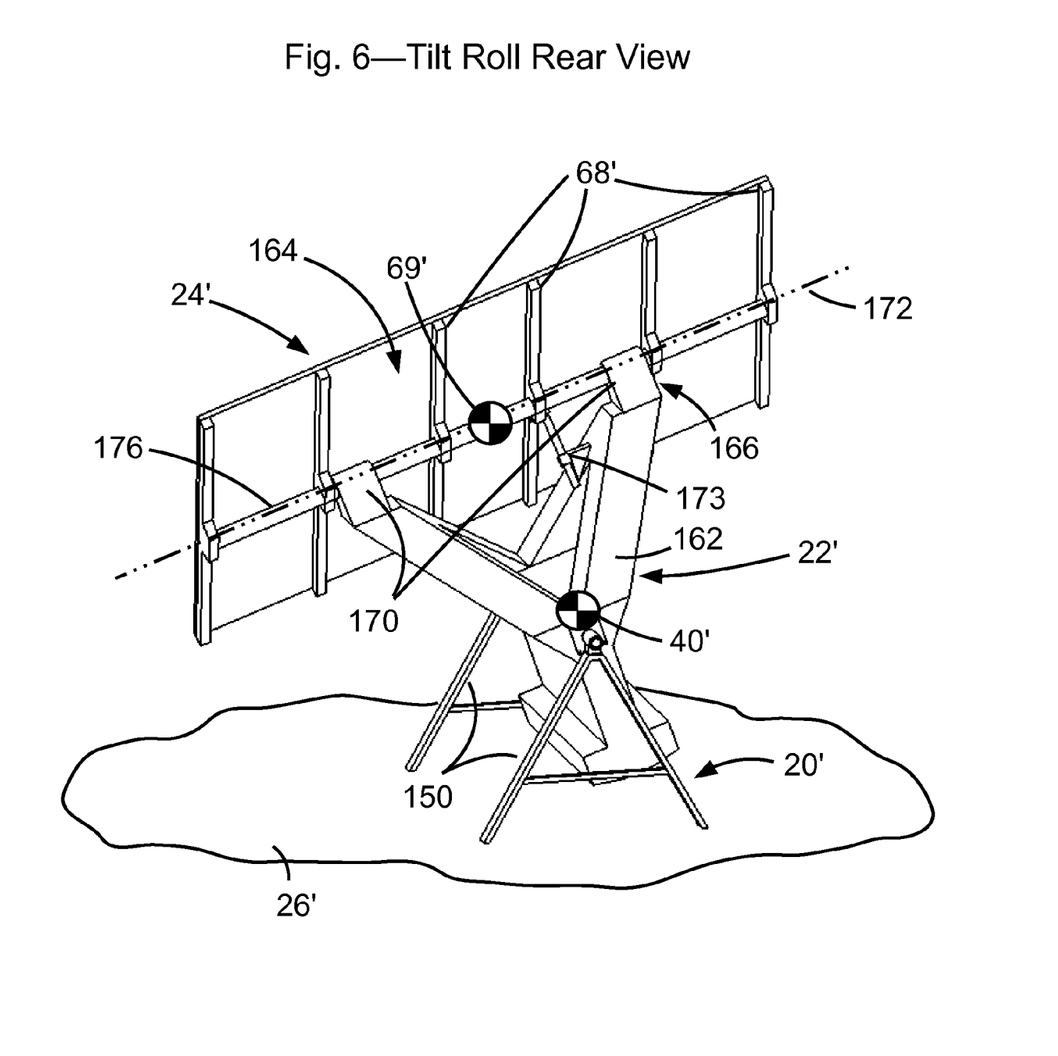
FIG. 6 is a perspective view of a tilt-roll style two axis tracking apparatus.

In the second embodiment, support 20' comprises two of a leg assembly 150 mounted on surface 26' at a set of contact surfaces 152. A bearing housing 154 is affixed at the top of each leg assembly 150. Both of bearing housing 154 in combination define the outer races of a tilt bearing set 156, and two of an axle 158 in combination define the inner races of tilt bearing set 156. A tilt axis 160 is defined to pass through the centerline of each bearing housing 154.

In the second embodiment, tracking assembly 22' comprises a tilt structure 162, a roll structure 164, and a roll bearing set 166 by which roll structure 164 is coupled to tilt structure 162. Tracking assembly 22' has a center of mass 40'. Each axle 158 is affixed to tilt structure 162 at the ends. Tilt structure 162 is constructed of reinforced concrete, and has a center of mass 168. Two of a roll bearing housing 170 are attached to the top of tilt structure 162 and define the outer race of roll bearing set 166. A roll axis 172, about which roll bearing set 166 pivots is substantially perpendicular to tilt axis 160. A roll actuator 173 is coupled between tilt structure 162 and roll structure 164. In this embodiment, roll actuator 173 is realized as an electrically operated linear actuator.

In the second embodiment, tilt structure 162 is coupled to support 20' by tilt bearing set 156. In this embodiment, tilt axis 160 is substantially horizontal. A tilt actuator 174 is coupled between tilt structure 162 and one leg assembly 150. Alternatively, tilt actuator 174 could couple between any part of tilt structure 162 and any additional element (not shown) mounted on surface 26'. In this embodiment, tilt actuator 174 is realized as an electrically operated linear actuator.

Roll structure 164 comprises a roll axle 176, six of a support brace 68', and a center of mass 69'. Roll axle 176 is inserted into each roll bearing housing 170 and acts as the inner race of roll bearing set 166. Each support brace 68' is affixed to roll axle 176 such that support braces 68' form a plane on which payload assembly 24' is mounted. One end of roll actuator 173 is pivotally attached to one support brace 68'.

Payload assembly 24' is identical in composition to payload assembly 24 described in the first embodiment.

Similarly to the definition in the first embodiment, a contact region 91' is defined as the minimum possible area that includes the set of contact surfaces 152 and is convex in shape.

Similarly to the definition in the first embodiment, an overturning axis 92' is defined as passing through one or more points along a boundary 94' of contact region 91'. Overturning axis 92' is further defined such that it does not pass through the inner area 95' of contact region 91'.

The forces acting on the tracking apparatus in the second embodiment are likewise defined similarly to those in the first embodiment. A wind pressure 96' is a pressure profile acting on the tracking apparatus due to a wind 98'. A wind moment 100' is the total moment about overturning axis 92' due to wind pressure 96'. A payload assembly moment 102', a tracking assembly moment 104', and a support moment 106' are moments about overturning axis 92' due to gravitational forces 108', 110', and 112' acting on payload assembly 24', tracking assembly 22', and support 20', respectively. A net gravitational moment (not shown) is the net combination of payload assembly moment 102', tracking assembly moment 104', and support moment 106'. A net overturning moment (not shown) is the combination of the net gravitational moment and wind moment 100' acting on the tracking apparatus.

Operation

The primary function of the second embodiment is identical to that of the first embodiment in that the position of each actuator 174, 173 is set as to orient payload assembly 24' to optimize energy collection. Also similar to the first embodiment is that payload devices 76' in the second embodiment are realized as an array of flat plate PV modules 78'.

In the second embodiment, one function of support 20' is to provide a stable base for the celestial tracking apparatus. Support 20' accomplishes this function by distributing gravitational, wind, and other loads from the tracking apparatus to surface 26'. In this embodiment, two of leg assembly 150 transfer vertical and lateral loads from tilt bearing set 156 to surface 26'.

In the second embodiment, one function of tilt structure 162 is to support roll bearing set 166. Tilt structure 162 is rotated about tilt axis 160 by the extension of tilt actuator 174. An additional function of tilt structure 162 is to contribute to tracking assembly moment 104' by way of the location of its center of mass 168 relative to overturning axis 92'. The use of a low-cost, low-strength structural material, such as reinforced concrete, as the structural material for tilt structure 162 further contributes to tracking assembly moment 104' by increasing the mass of tilt structure 162.

In the second embodiment, one function of roll structure 164 is to provide structural rigidity and strength to payload assembly 24'. In this embodiment, roll actuator 173 is realized as an electrically operated linear actuator, the extension of which causes roll structure 164 to rotate relative to tilt structure 162 about roll axis 172. An additional function of roll structure 164 is to contribute to tracking assembly moment 104' by way of the location of its center of mass 69' relative to overturning axis 92'.

In the second embodiment, one function of payload assembly 24' is to collect electromagnetic energy and covert it to a usable form. An additional function of payload assembly 24' is to contribute to payload assembly moment 102' by way of the location of its center of mass 74' relative to overturning axis 92'.

Under normal operating conditions, the net overturning moment acts in a direction such that it is counteracted by contact pressure acting on contact surfaces 27'. However, if wind pressure 96' becomes large enough, for example in high wind conditions, net overturning moment could change sign. This would result in a rotational acceleration of the tracking apparatus about overturning axis 92', which could ultimately topple the tracking apparatus. It follows that if the net gravitational moment is established to be greater than the maximum wind moment 100' expected to be experienced during the operating life of the tracking apparatus, then the tracking apparatus will not be expected to overturn due to wind forces.

The use of concrete as a structural material in the second embodiments provide similar advantages as is the case in the first embodiment. This include the increase in structural mass in the moving components (i.e. tracking assembly 22' and payload assembly 24') in combination and thus the net gravitational moment without a significant increase in cost and the reduction in redundant and inefficient materials. Of course, the corrosion resistant nature of reinforced concrete is also beneficial in the second embodiment.

Figure 10:
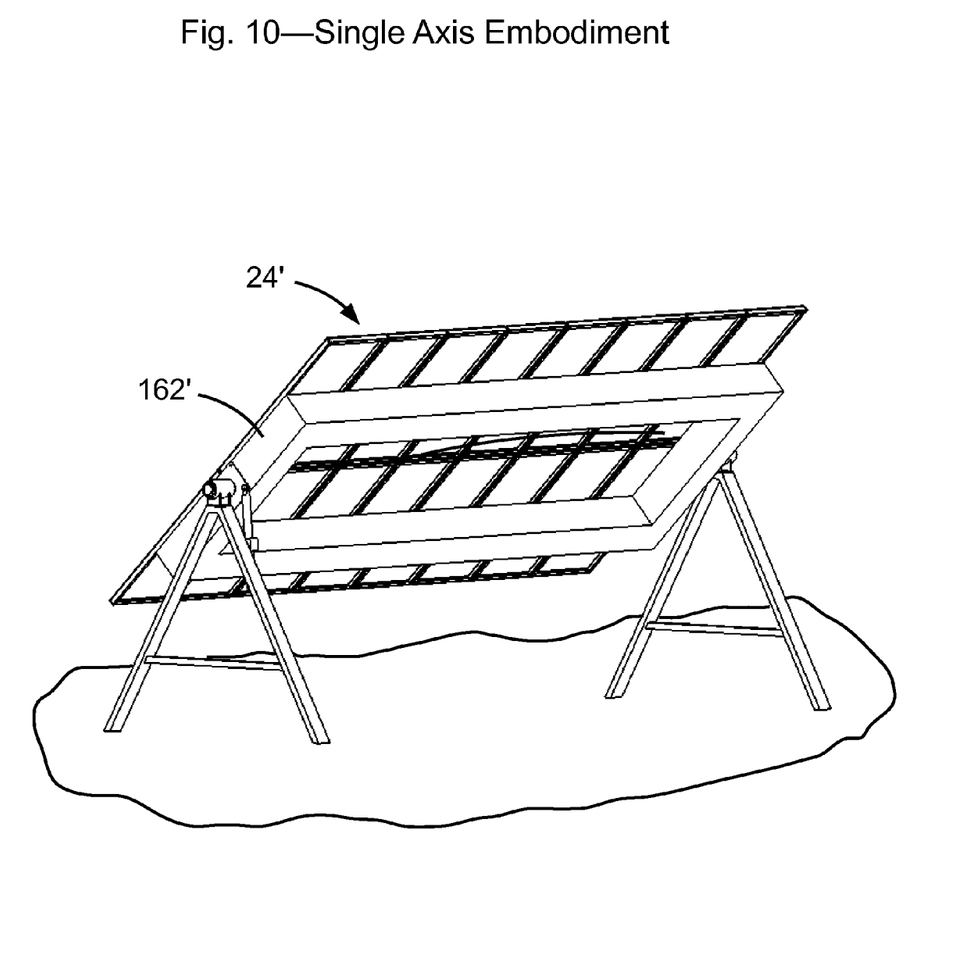
FIG. 10 is a perspective view of a single axis tracking apparatus.
Figure 11:
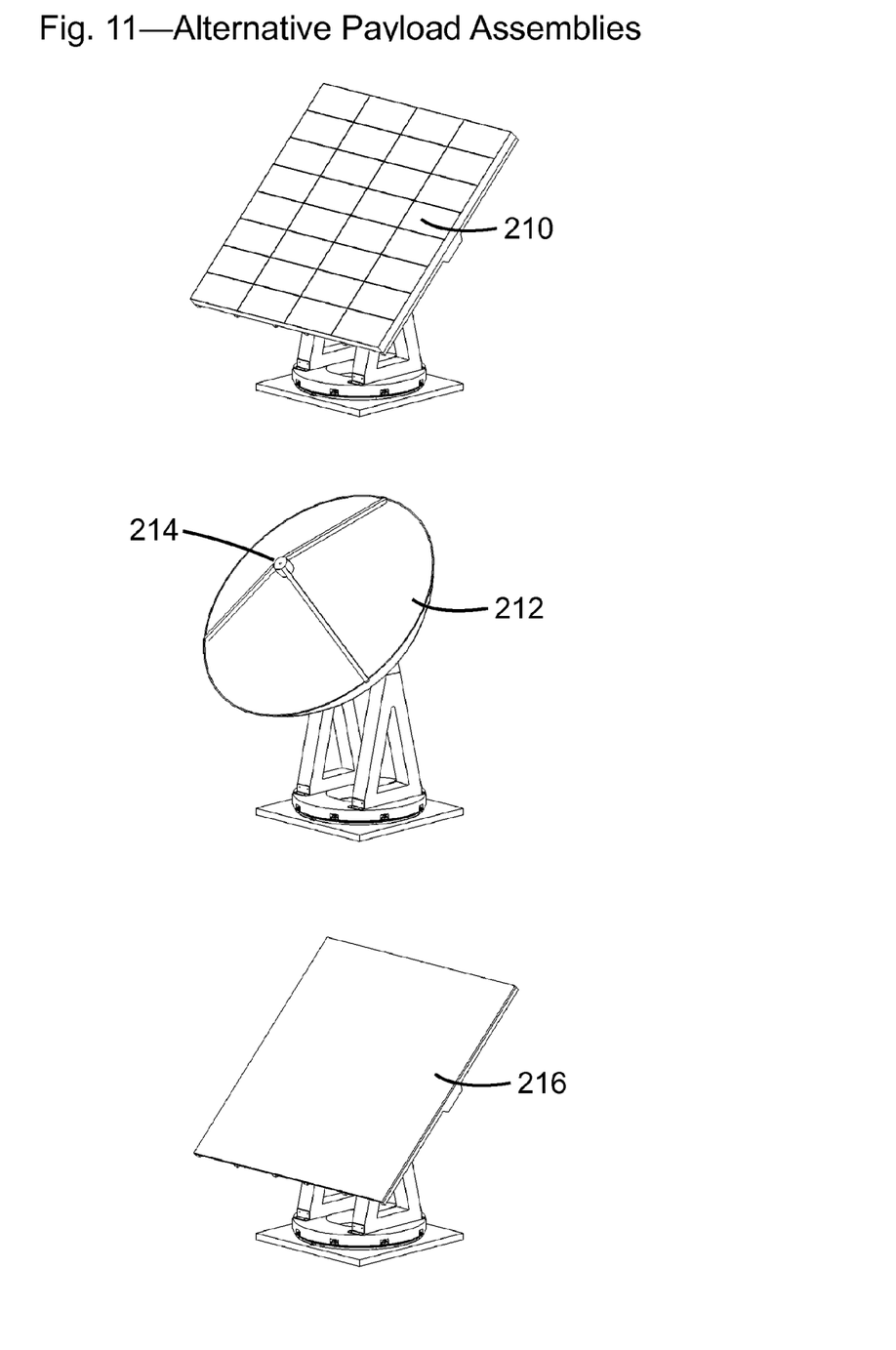
FIG. 11 shows views of alternative payload assembly configurations for an azimuth-elevation style two axis tracking apparatus.

FIGS. 9, 10

Alternative Embodiments

There are many possible tracking apparatus configurations besides the specific embodiments described above that can benefit from the current invention. These could include a number of single axis tracking apparatuses, one of which (not shown) is similar to the first embodiment except that payload assembly 24 is mounted directly to azimuth structure 34, effectively eliminating elevation axis 48. In yet another embodiment, shown in FIG. 9, a single axis tracking apparatus is defined similar to the second embodiment except that payload assembly 24' is mounted directly to a tilt structure 162', effectively eliminating roll axis 172. Also similar to the second embodiment, tilt structure 162' is constructed of reinforced concrete.

Other embodiments could include more than two axes of motion. For example, the azimuth-elevation configuration of the first embodiment could be augmented by one or more additional axes of motion located between elevation structure 36 and payload assembly 24. If the additional axis or axes were capable of precise motion but only over a limited range of motion, then the additional axis or axes could provide a trim function whereby the orientation of payload assembly 24 could be made more precise than would otherwise be possible using the combination of azimuth bearing assembly 52 and elevation bearing set 38 alone.

In addition to the flat plat PV modules described in the first and second embodiment, alternative embodiments could include a wide range of payload types. FIG. 10 shows three different payload types mounted on the tracking assembly described in the first embodiment. These include an array of concentrating PV modules 210, a concentrating combination of a paraboloidal reflective surface 212 and a thermal energy collector 214, and a reflective surface 216 intended to direct electromagnetic radiation 81 to a remote collector (not shown).

ADVANTAGES CONCLUSIONS, RAMIFICATIONS, AND SCOPE

One of the essential benefits of the invention described herein is the substantial use of gravitational forces acting on the structural elements to resist overturning moments due to wind in a celestial tracking apparatus. The elements on which the gravitational forces act are not substantially limited to part of support 20, 20' as is typical in prior art, but instead include substantial moving elements of the structure, such as tracking assembly 22, 22' and payload assembly 24, 24'. As a result, the pivot that couples support 20, 20' to tracking assembly 22, 22' is subject to less moment load than would otherwise be the case. This can result in simplified and less costly bearings than are currently found in the prior art.

In addition, the use of structural elements to also provide overturning resistance reduces the need for a separate, massive ballasted foundation, or reduces the design loads for a dug-in foundation. In effect, this eliminates some redundant materials and serves to lower total system cost. A foundation may still be required to perform other functions, such as to distribute loads to the soil in a ground mounted system, but in many cases the mass of the foundation, and therefore the amount of material required is reduced.

Reinforced concrete is an advantageous material to use as a structural material for a variety of reasons. On a strength to cost basis, reinforced concrete is substantially less expensive than other metals that are typically used for the structural components of celestial tracking apparatuses. Further, concrete is inherently corrosion resistant to many of the elemental forces commonly witnessed in celestial tracking applications.

Because reinforced concrete has a significantly lower yield strength than the metals used in structures, the mass required to develop similar structural strength is significantly higher. As a result, the mass of a reinforced concrete structure is typically higher than the mass of an equivalent metal structure. The increased mass of the equivalent structure provides an additional benefit beyond the lower cost and better corrosion resistance, in that the gravitational forces on the structure can provide additional overturning resistance. Ultimately, the cost of the system can be reduced by both the use of reinforced concrete as a lower cost structural material and by the reduced use of redundant material in the foundation.

While the above descriptions contain many specificities, these should not be construed as limitations on the scope of the invention, but rather as exemplifications of several embodiments thereof. Many other variations are possible, including, for example:

(a) Actuator types other than those described could be used to position the axes of the apparatus. Such actuator types could include, among others, hydraulic, compressed air actuated, electrostatic, or any other unspecified actuator and mechanism that can provide the motion required for the application.

(b) One or more additional tracking axes could be used in conjunction with the two axes of apparatus described above in the first embodiment as a way to improve tracking performance or dynamic range.

(c) Other types of payload devices besides the flat plate PV modules described in the above embodiments are possible. This could include concentrating PV collectors, concentrating PV modules, or concentrating solar thermal collectors, to name a few.

(d) The payload devices may have shapes other than planar, such as long focal length lens-based concentrators.

(e) The payload device may have a reflective, rather than absorptive surface, such is the case with parabolic trough concentrators or heliostatic devices. For reflective collectors, a separate energy collection device is typically also present, either as part of the payload assembly or separate from the tracking apparatus.

(f) The structural elements made of reinforced concrete could be different from those described in the specific embodiments above. For example, elevation structure 36 could be constructed of reinforced concrete, as could some portion of payload assembly 24. Elements of other embodiments not specifically described here could also be made of reinforced concrete.

(g) While the embodiments describe the use of reinforced concrete as a structural material, any self-curing material could be used in its place. Such materials could include polymers such as two-part epoxies, air curing compounds, or moisture curing compounds.

(h) In a general sense, concrete is defined as any material by which an aggregate such as sand, rock or stone is bound together in a cement matrix. For the purposes of this document, concrete can also include the use of other admixtures such as plasticisers, water reducers, air entrainers, and other cementitious materials such as blast slag and fly ash. Further, reinforced concrete can include a variety of reinforcing materials, including steel bars, steel fibers, glass fibers, and other similar materials.

Accordingly, the scope of the invention should be determined not by the embodiments illustrated, but by the appended claims and their legal equivalents.

What is claimed:

1. A wind resistant celestial tracking apparatus comprising:
 a support structure mounted on a surface at one or more contact surfaces, with said support structure having a first center of mass;
 a tracking assembly having a second center of mass and being pivotally coupled to said support structure about a substantially horizontal first axis, said tracking assembly being configured to pivot about said substantially horizontal first axis, said second center of mass being located at an offset from said substantially horizontal first axis;

a payload assembly mounted on said tracking assembly along a second axis that is substantially perpendicular to said substantially horizontal first axis, said payload assembly being configured to pivot about said second axis, comprising a third center of mass, and being an array of one or more photovoltaic modules;

a contact region, said boundary of which is in contact with said one or more contact surfaces;

an overturning axis coincident with one or more points along said boundary of said contact region and not passing through said contact region;

a net wind moment resulting from a wind pressure profile acting on said wind resistant celestial tracking apparatus about said overturning axis;

a net gravitational moment resulting from gravitational forces acting on said first center of mass, said second center of mass, and said third center of mass about said overturning axis; and a net overturning moment maximized about said overturning axis in a direction acting to overturn said wind resistant celestial tracking apparatus and resulting from a combination of said net wind moment and said net gravitational moment, wherein the magnitude of said net gravitational moment is greater than the magnitude of said net wind moment, and the magnitude of a net contribution to said net gravitational moment from said second center of mass and said third center of mass is greater than the magnitude of a contribution from said first center of mass.

2. A tilt-roll tracking apparatus comprising:

a support structure mounted on a surface, the support structure comprising peripheral edges defining overturn axes of the tilt-roll tracking apparatus and a first center of mass;

a tilt structure that comprises an axle and is pivotally coupled to the support structure at the axle, the tilt structure being configured to pivot about a substantially horizontal tilt axis that passes through a centerline of the axle, and the tilt structure further having a second center of mass that is located at an offset from the substantially horizontal tilt axis;

a roll structure pivotally coupled to the tilt structure, and the roll structure being configured to pivot about a roll axis that is substantially perpendicular to the substantially horizontal tilt axis; and a payload device coupled to the roll structure, and the payload device being configured to interact with electromagnetic radiation, the payload device and the roll structure having a third center of mass;

wherein a magnitude of a net contribution to a net gravitational moment about the overturn axes from the second center of mass and the third center of mass is greater than a magnitude of a contribution to the net gravitational moment about the overturn axes from the first center of mass.

3. The tilt-roll tracking apparatus of claim 2, wherein the offset is greater than a radius of the axle.

4. The tilt-roll tracking apparatus of claim 2, wherein the support structure comprises a plurality of leg assemblies, wherein the tilt-roll tracking apparatus further comprises a plurality of tilt bearings coupled to a plurality of tops of the plurality of leg assemblies, and wherein the axle is inserted into at least one of the plurality of tilt bearings.

5. The tilt-roll tracking apparatus of claim 2, wherein the tilt structure is constructed of reinforced concrete.

6. The tilt-roll tracking apparatus of claim 2, wherein the tilt structure is constructed of a self curing compound.

7. The tilt-roll tracking apparatus of claim 2, wherein the payload device comprises an array of a plurality of photovoltaic modules.

8. The tilt-roll tracking apparatus of claim 2, wherein the payload device comprises an array of a plurality of reflective surfaces.

9. The tilt-roll tracking apparatus of claim 2, further comprising a tilt actuator coupled to the support structure and the tilt structure, wherein the tilt actuator is configured to actuate pivotal displacement of the tilt structure about the substantially horizontal tilt axis.

10. The tilt-roll tracking apparatus of claim 9, wherein the tilt actuator is located between the support structure and the tilt structure.

* * * * *